Aug. 4, 1931.  A. F. PANDO  1,817,265
AIR FILTER FOR INTERNAL COMBUSTION ENGINES
Filed May 3, 1930
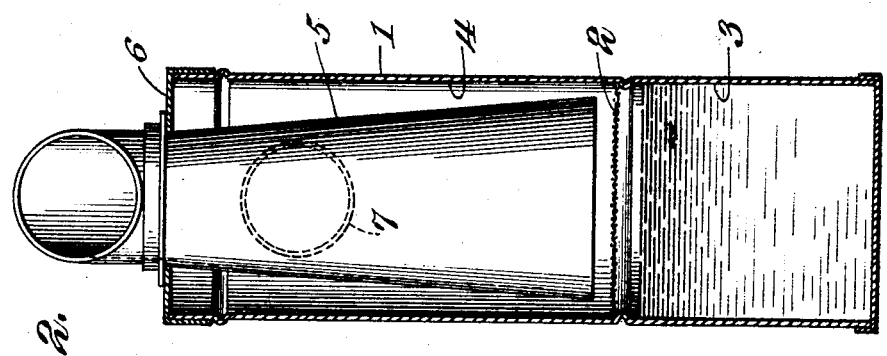
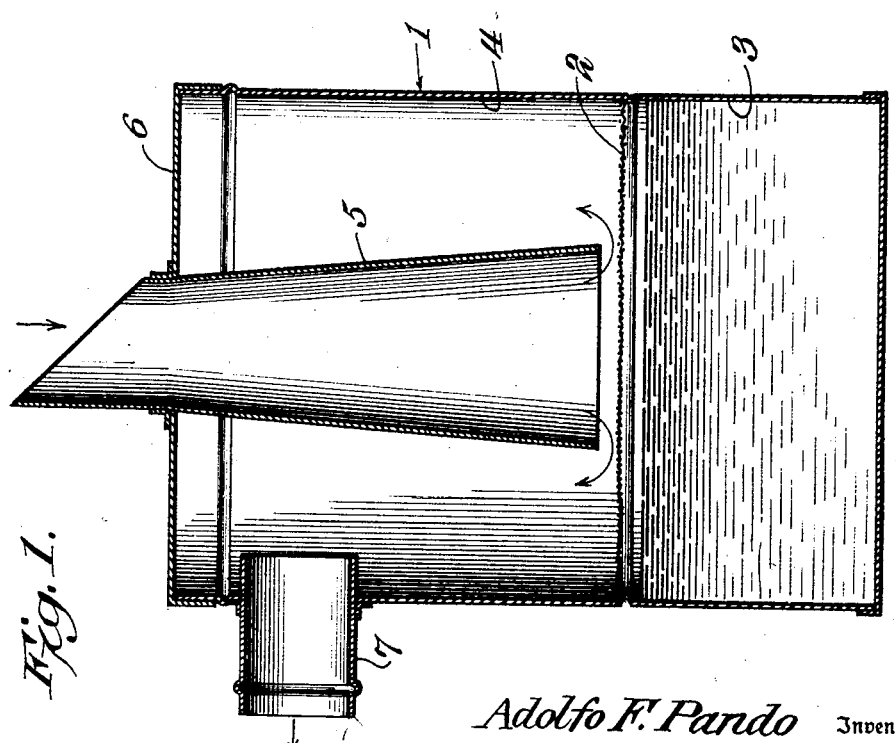
Adolfo F. Pando Inventor Patented Aug. 4, 1931

1,817,265

UNITED STATES PATENT OFFICE

ADOLFO F. PANDO, OF LA PLATA, ARGENTINA

AIR FILTER FOR INTERNAL COMBUSTION ENGINES

Application filed May 3, 1930, Serial No. 449,487, and in Argentina February 7, 1930.

My invention refers to an apparatus for humid filtering of air supplied to internal combustion motors, with the object of filtering the air, admitted by the carburetor for combustion, avoiding the passage of dirt, grit and other foreign matters into the cylinders with consequent damages.

For further illustration a drawing is adjoined, in which two views are shown similar parts being marked with the same numerals.

Fig. 1 is a central longitudinal vertical section of the apparatus, and

Fig. 2 is a vertical section of the same at right angles to Fig. 1 certain parts being shown in elevation.

This apparatus consists of a closed vessel 1, inside of which, at a certain height, is placed a screen 2 made of metal or any porous material, this screen dividing the vessel into two chambers, one below and the other above said screen.

The lower chamber 3 is filled with water, oil or any other liquid till it nearly touches the screen 2.

In the upper chamber 4 there is a funnel-shaped device 5, fixed to the lid 6 of the vessel, the lower edge of the said funnel 5 being placed very near to the screen 2.

This funnel-shaped device is open at both ends, and the air enters the vessel through the said open ends.

A tube 7, attached to the chamber 4 may be connected to the intake of the carburetor of the motor by any suitable flexible or rigid tubing, as desired.

The above device works as follows: When air is drawn into the carburetor, a vacuum is produced in chamber 4, which causes the air from outside to flow with a certain velocity through the funnel 5, and pass along the screen 2, which is kept wet due to the liquid in chamber 3. All foreign matters, such as dirt, grit, sand etc., which may be drawn in by the column of air formed by the funnel, will, by inertia and gravity, hit against the screen and remain adherent thereto, so that the air enters chamber 4, practically free from said undesirable matter.

As the liquid in chamber 3 is in continuous movement due to the movement of the vehicle, whatever dirt etc., adheres to the screen will be dissolved or loosened and fall to the bottom of the vessel.

The level of the liquid can be maintained, should it not be desired to change same every five or six days, by means of an auxiliary hermetic tank, provided with a small tube reaching the level of the liquid, in such a way that when the end of this tube is uncovered by the liquid in chamber 3, the tank will provide the necessary quantity.

Moreover, as the air during its passage to the carburetor, becomes charged with some humidity, when an aqueous liquid is used in chamber 3, an extremely smooth working of the motor is obtained, and less carbon is deposited in the cylinders.

Having now fully described and ascertained the nature of my present invention and the manner in which same is to be carried into practice, I declare that what I claim is:

1. An apparatus for cleaning the air supply to internal combustion engines for vehicles, comprising a screen, means for supplying a liquid to said screen continuously to keep it moistened therewith, and means for causing the air passing to the carburetor of the engine to impinge against said screen and be deflected thereby, said means comprising a tube with an open end terminating adjacent the screen, the liquid supply being arranged so as to be continually agitated by the vibration due to the operation of the engine itself, whereby it continually impinges against the screen and assists in removing the impurities adhering thereto.

2. An apparatus for cleaning the air supply to internal combustion engines for vehicles, comprising a receptacle, a horizontal screen in said receptacle dividing it into two compartments, the lower compartment containing a liquid, said screen being continuously moistened therewith, and means for causing the air passing to the carburetor of the engine to impinge against the upper surface of said screen and be deflected thereby, said means comprising a tube with an open end terminating adjacent and above the screen, the liquid supply being continually agitated by the vibration due to the operation of the engine itself, whereby it continually impinges against the screen and assists in removing the impurities adhering thereto.

3. An apparatus for cleaning the air supply to internal combustion engines for vehicles, comprising a receptacle divided into two compartments by a screen, a supply of liquid in one of said compartments, means for supplying said liquid to said screen continuously to keep it moistened thereby, means for causing the air passing to the carburetor of the engine to impinge against one surface of said screen and be deflected thereby, said means comprising a funnel shaped tube with an open end terminating adjacent the screen, the liquid supply in the compartment being arranged so as to be continually agitated by the vibration due to the operation of the engine itself, whereby it continually impinges against the screen and assists in removing the impurities adhering thereto.

In testimony whereof I affix my signature.

ADOLFO F. PANDO.